(No Model.)

C. W. McLEAN.
BILLIARD TABLE.

No. 253,544. Patented Feb. 14, 1882.

WITNESSES
F. B. Townsend
W. C. Adams

INVENTOR
Christopher W. McLean
per M. E. Dayton
Attorney

N. PETERS, Photo-Lithographer, Washington, D. C.

UNITED STATES PATENT OFFICE.

CHRISTOPHER W. McLEAN, OF NEW BERNE, NORTH CAROLINA.

BILLIARD-TABLE.

SPECIFICATION forming part of Letters Patent No. 253,544, dated February 14, 1882.

Application filed June 4, 1881. (No model.)

*To all whom it may concern:*

Be it known that I, CHRISTOPHER W. MCLEAN, of New Berne, in the State of North Carolina, have invented certain new and useful Improvements in Billiard-Tables; and I do hereby declare that the following is a full, clear, and exact description thereof, reference being had to the accompanying drawings, and to the letters of reference marked theron, which form a part of this specification.

This invention relates to the beds of billiard-tables; and it consists in a table provided with a bed of glass.

The beds of billiard-tables as heretofore constructed have been made of slate and marble slabs and other descriptions of stone. By reason of their large size such slabs have been costly and liable to fracture. They are, moreover, calculated by their structure to readily absorb moisture, which interferes with the free action of the balls.

By making the bed of glass, which can be readily poured in a molten state to form a slab of any desired size and thickness, the original cost of the bed is greatly lessened, and a bed is obtained of such texture that moisture does not affect it. The surface can be finished cheaply by grinding to give the necessary accuracy, or it can be polished to any desired extent. By reason of its flexibility a glass bed is also much less liable to break than a similar slab of stone, and not having the granular structure of stone, will not crumble under the vertical blows of a cue to which a billiard-table bed is sometimes subjected.

Figure 1:
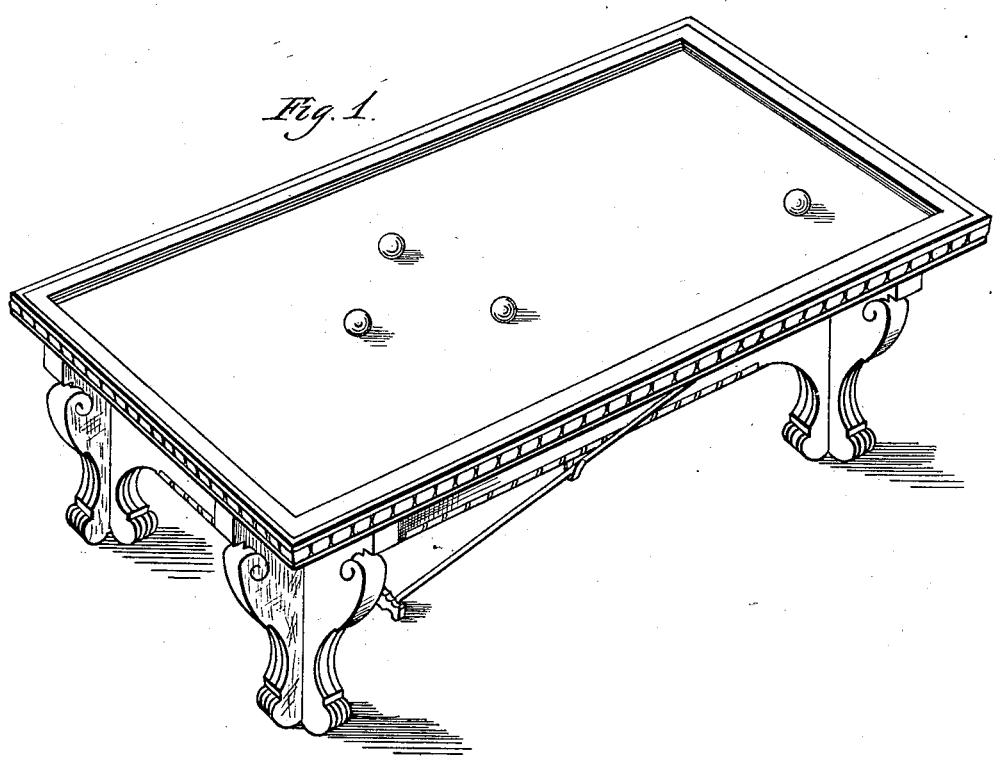
Figure 2:
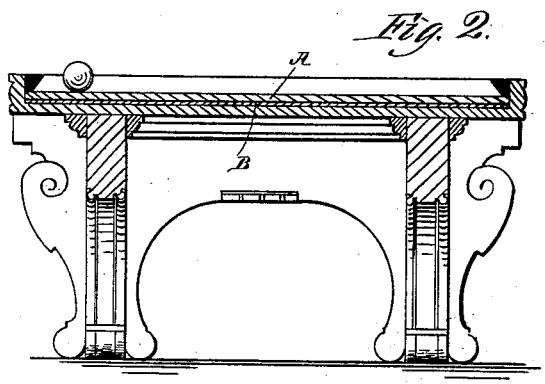

In the drawings, Figure 1 is a perspective view of a billiard table, and Fig 2 is a vertical transverse section.

A is the glass bed, resting on any suitable foundation or support, B, and preferably covered in the usual manner.

I am aware that billiard-table tops have been made of glass plates or blocks laid in sections to form the bed, and such I do not claim.

I claim as my invention—

A billiard-table top or bed composed of a slab of glass cast in one piece, as set forth.

In testimony that I claim the foregoing as my invention I affix my signature in presence of two witnesses.

CHRISTOPHER W. McLEAN.

Witnesses:
J. M. HAFLEIGH,
JOHN C. GRANGER.